April 26, 1966 F. KASTEL 3,248,495
TEST PROBE ENTRY CONNECTOR
Filed May 27, 1963 2 Sheets-Sheet 1

INVENTOR.
FRED KASTEL
BY [signature]
ATTORNEY

April 26, 1966 F. KASTEL 3,248,495
TEST PROBE ENTRY CONNECTOR
Filed May 27, 1963 2 Sheets-Sheet 2

INVENTOR.
FRED KASTEL
BY Julian Caplan
ATTORNEY

United States Patent Office 3,248,495
Patented Apr. 26, 1966

1

3,248,495
TEST PROBE ENTRY CONNECTOR
Fred Kastel, 3434 Edison St., San Mateo, Calif.
Filed May 27, 1963, Ser. No. 283,186
11 Claims. (Cl. 200—61.58)

This invention relates to a new and improved test probe entry connector. The device comprises a tool for testing electrical components and a device installed in an electrical circuit near or combined with a component for use in conjunction with the tool to test the component.

Electrical components of a circuit tend to become ineffective and must be replaced for various reasons. Devices of this type are various resistance elements, condensers, and the like. Heretofore, in repairing circuits it has been necessary to isolate the elements suspected of being defective and make tests with instruments, such as ammeters and ohmmeters. Isolation of the element has usually required cutting a wire and, accordingly, when the test has been completed the wire must be resoldered or otherwise repaired. These operations are time-consuming. Where the space for access to the component is limited the performance of the cutting operation and resoldering are extremely difficult. Further, proper resoldering of the connection is sometimes not achieved which introduces a new possibility for trouble in the circuit.

The present invention employs a device which is permanently installed in the circuit in series with the element and is hereinafter sometimes termed a "gate." The gate has a fixed electrical contact which is connected into the circuit and a movable contact which is spring-biased against the fixed contact and is likewise connected into the circuit. Normally the circuit is closed by the two contacts being forced against each other. However, the present invention also uses a tool which forces the spring-biased contact away from the permanent contact and hence breaks the circuit to the electronic element under test thereby isolating the same and permitting testing instruments to be used. As a further feature, the gate is so constructed that when the spring-biased contact is forced away from the permanent contact, the spring-biased contact establishes an electrical connection with a lead wire of the tool and may be thus connected to an instrument. Accordingly, the gate and tool may be used in conjunction with an ammeter so that the current can be measured and further the resistance can be isolated and the resistance measured.

The switch may be wired in series with a conventional electronic component, or may be manufactured as an integral part thereof.

A further feature and advantage of the invention is the fact that the dimensions of the device are small and hence the device may be installed in existing circuits, or may be incorporated in new circuits without requiring additional space for wiring.

Other objects of the present invention will become apparent upon reading the following specification and referring to the accompanying drawings in which similar characters of reference represent corresponding parts in each of the several views.

In the drawings:

FIGS. 4A, 4B and 4C are views similar to FIG. 2 of

Figure 1:
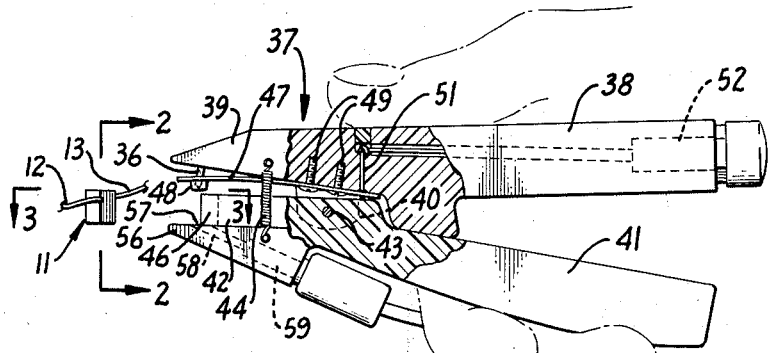
FIG. 1 is a side elevational view partly broken away in section showing the gate and the tool about to be applied to the gate.
Figure 2:
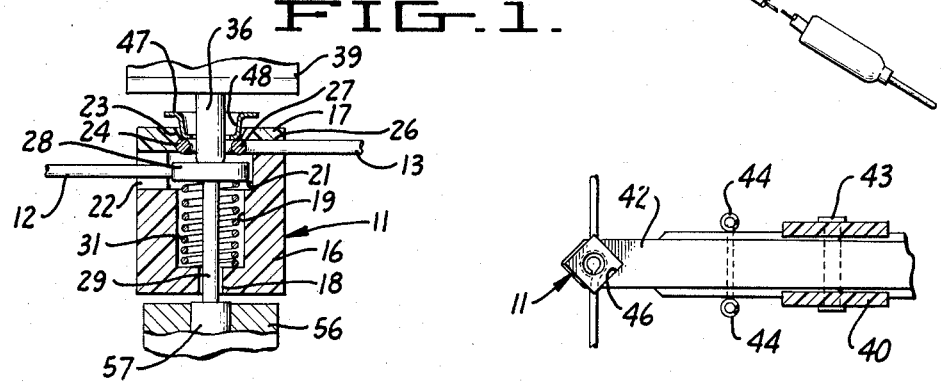
FIG. 2 is an enlarged sectional view taken substantially along the line 2—2 of FIG. 1, showing a portion of the tool applied to the gate and showing the contacts apart.
Figure 3:
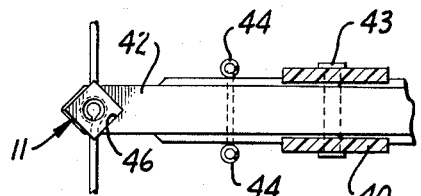
FIG. 3 is a sectional view taken substantially along the line 3—3 of FIG. 1.
Figure 4B:
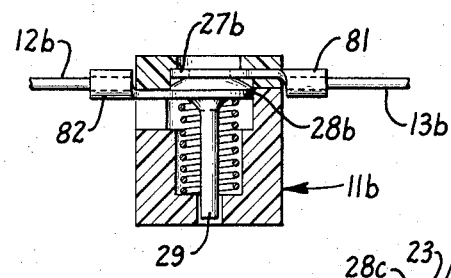

2 modified gates showing the contacts together. FIG. 4D is a top plan of the structure of FIG. 4C.

Figure 5:
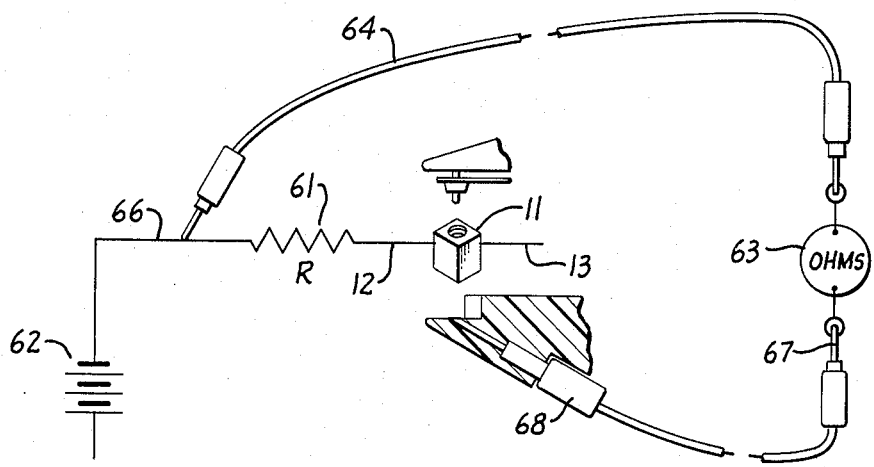
Figure 6:
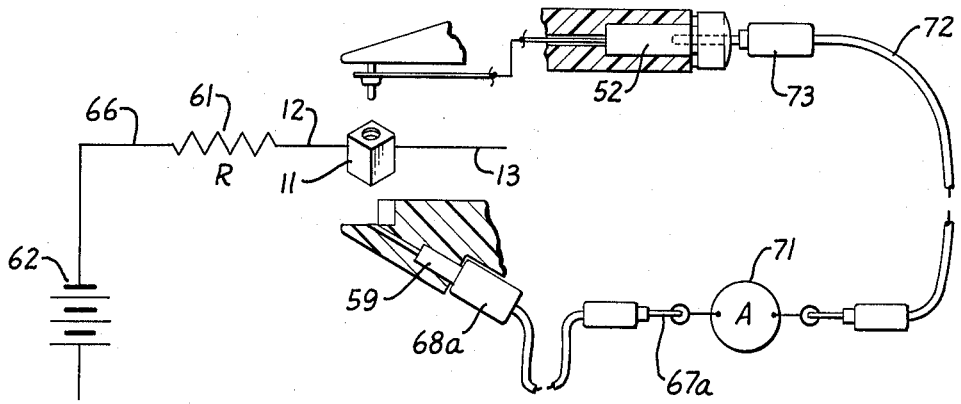

FIGS. 5 and 6 are schematic wiring diagrams showing the device installed in typical circuits to measure respectively the resistance of a component and the current through the circuit where the component is installed.

The gate 11 is a small device having lead wires 12 and 13 extending therefrom which are installed in series in an electric circuit with a resistor, condenser or the like as hereinafter explained. Gate 11 has a non-conductive, two-piece housing consisting of a bottom 16 and top 17 which are suitably joined together by means of adhesive, staples, forced fit, or various other means which will readily occur to one skilled in the art. Bottom 16 has a small diameter bottom opening 18 which opens into a larger diameter cavity 19 of extended length and having a wide top bore 21. Lead wires 12 extend out through a wide opening 22 communicating with top bore 21. Top 17 has a top opening 23 below which is an enlarged diameter portion 24 substantially of the same size as bore 21. An opening 26 for lead wire 13 is formed in the bottom edge of top 17.

In bore 24 is a circular stationary contact 27 which is electrically connected to lead wire 13. In bore 21 is a movable contact 28 which is electrically connected to lead wire 12. Depending from contact 28 is an elongated conductive stud 29 which extends into bottom opening 18 and is sometimes projected outwardly thereof. Surrounding stud 29 inside hole 19 is a spring 31 which fits against the bottom of hole 19 and also bears against the underside of contact 28 thereby biasing contact 28 toward contact 24. In normal condition of the gate, contacts 27 and 28 are electrically connected and hence current flows through the gate 11 to complete the electrical circuit. By means hereinafter described, a non-conductive probe 36 of tool 37, as hereinafter described in detail, depresses movable contact 28 and breaks the connection with contact 27 thereby isolating the electrical component with which the gate is in series. Such operation depresses stud 29 so that it projects out through opening 18 and is exposed at the bottom of gate 11.

Figure 4A:
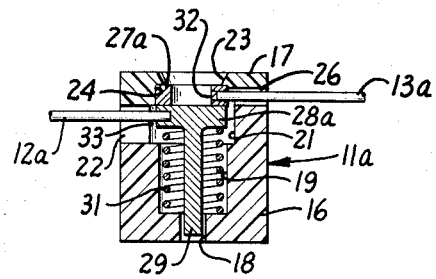
Figures 4C, 4D:
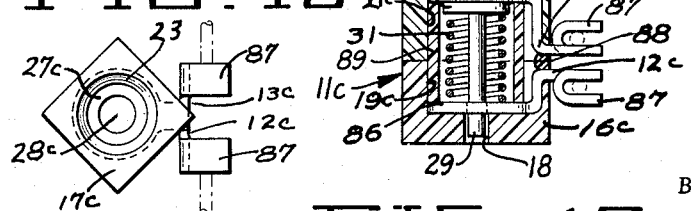

Directing attention now to FIG. 4A, which is a modification, corresponding parts have been marked with identical reference numerals followed by the subscript "a" where any variations in construction occur. In this modification, contact 27a is formed as a ring having a radially disposed hole 32. Lead wire 13a fits into hole 32 with sufficient clearance. The surface of hole 32 is tinned or soldered. Hence, a joint may be formed between contact 27a and wire 13a merely by inserting the end of the wire 13a into hole 32, after applying solder flux and enough heat to melt the solder in hole 32. Similarly, contact 28a is formed with a hole 33 extending radially and the surface of hole 33 is tinned so that the electrical connection between contact 28a and wire 12a may be made in similar fashion.

FIG. 4B is a view similar to FIG. 4A, showing a still further modification. In this modification, top contact 27b has an integral or electrically connected hollow lateral projection 81 which protrudes out through opening 26. The end of wire 13b may be inserted in the hollow terminal of projection 81 to form a connection therewith. Similarly, top contact 28b has a lateral projection 82 which extends out through opening 22. The end of wire 12b is inserted in the exposed opening of terminal 82 to establish contact therewith. This construction simplifies the attachment of the lead wires to the contacts of the gate.

FIG. 4C shows still another modification. In this modification a sliding contact 86 is installed at the bottom of bore 19, the stud 29 sliding through the hole in contact 86. Lead wire 12c extends down through the body of lower portion 16c and is connected to contact 86 in any convenient manner. Spring 31 bears against contact 86 and hence an electrical connection is established between lead wire 12c, contact 86, spring 31 and contact 28c. The form of the invention as shown in FIG. 4C has certain advantages, in that the wire 12c does not move when the contact 28c is depressed but the movement of the contact is accommodated by stud 29 sliding within contact 86 and without breaking electrical connection therewith.

In this form of the invention, casing halves 16c and 17c are split about medially. Insulation 88 holds wires 12c and 13c apart. An insulating sleeve 89 is disposed inside cavities 19c and 21c and holds contacts 27c and 86 imbedded in said cavities spaced apart. Contact 28c slides inside sleeve 89. In the form of the invention shown in FIGS. 4C and 4D, lead wires 12c and 13c terminate externally of the casing in clips 87 which may be crimped or solder-connected to wires in the circuit.

The tool 37 is of a lever-type with the upper member having upper hand grip 38 and upper jaw 39 from which depend, on either side of the tool, side members 40. The lower hand grip 41 has a bottom jaw 42 of lesser width than the space between side members 40 and pivotally connected thereto by transverse pivot pin 43. Springs 44 on either side of the tool are connected at either end to the top and bottom jaws 39 and 42 and bias the same into contact with each other. When the user exerts pressure on the handles 38 and 41 the jaws are forced apart but when such pressure is released springs 44 bring the jaws toward each other.

As shown in the accompanying drawings, the gate 11 has a square exterior in top plan and the forward end of jaw 42 is cut away in an angular recess 46 to receive the corner of gate 11. It will be understood, however, that the shape of gate 11 is subject to variation and accordingly that the shape of the recess 46 may similarly be varied. Preferably, the tool 37 is formed principally of non-conductive materials and a non-conductive stud 36 depends from top jaw 39 in such position that when the gate 11 is in recess 42 stud 36 fits inside opening 23 and through the loop in contact 27 into contact with contact 28. Upper jaw 39 also carries on its undersurface a conductive spring 47 having at its outer end a downwardly extending cup-like portion 48 formed with a central hole through which stud 36 projects. Spring 47 may be held in place on jaw 39 by means of screws 49, or other means. The inner end of spring 47 is connected by lead wire 51 which extends back through top handle 38 to a socket 52 in the end of handle 38. Socket 52 is a jack to which a plug 73 of a prod instrument may be connected in a manner and for a purpose hereinafter explained.

Lower jaw 42 has a bottom outwardly extending slanted projection 56 which extends outwardly beyond recess 46 and has imbedded in its surface a contact 57 which is connected by a lead wire 58 to a jack 59 into which fits a second plug for a purpose hereinafter explained.

In the use of the tool, the handles 38 and 41 are gripped together thereby spreading the jaws 39 and 42 apart. The gate 11 may then be inserted between the jaws with one corner fitting into the recess 46. Upon release of the handles 38 and 41, springs 44 bring the jaws together. Cup 48 enters into top hole 23 so that the cup makes an electrical connection with top contact 27. Stud 36 engages movable contact 28 and breaks the connection between contact 28 and contact 27. It also pushes the end of stud 29 out through hole 18 into contact with contact 57. Completion of this operation breaks contact between wires 12 and 13 and establishes contact between wire 12 and plug 59 and wire 13 and plug 52.

Directing attention now to FIG. 5, gate 11 is installed in series with a resistance 61 and a source of potential difference 62. An ohmmeter 63 is to be used to check the number of ohms in resistance 61. For such purpose one lead 64 of ohmmeter 63 is placed in contact with wire 66 between source 62 and resistance 61. The other lead wire 67 of ohmmeter 63 has a jack 68 which is inserted in plug 59. When the tool is in place the wires 12 and 13 are separated from contact and wire 12 connected to lead wire 67 of the ohmmeter. Accordingly, as is apparent, the number of ohms in resistance 61 may be read on the ohmmeter.

Directing attention now to FIG. 6, the current is to be checked with an ammeter 71. Lead 67a thereof is connected by jack 68 with socket 59. The other lead 72 of ammeter 71 is connected by jack 73 with socket 52. When the tool is in place on gate 11, wire 13 is not isolated from the circuit. Current flowing through resistance 61 passes from lead 12 to contact 57, thence to lead 67a, through ammeter 71, back through lead 72 and cup 48 to contact 27 and lead 13. Hence, the current is read on meter 71.

Gate 11 may be installed in series with various other components in addition to resistances 61 and tool 37 may be used with other testing instruments other than ammeter 71 and ohmmeter 63. Gate 11 may also be manufactured as an integral part of a component such as resistance 61.

Although the foregoing invention has been described in some detail, by way of illustration and example for purposes of clarity of understanding, it is understood that certain changes and modifications may be practiced within the spirit of the invention and scope of the appended claims.

What is claimed is:

1. An element of a circuit used in testing an electrical component comprising, a casing, a stationary first contact within said casing, a first lead wire connected to said first contact, a second contact within said casing movable toward and away from said first contact, a second lead wire connected to said second contact, resilient means biasing said second contact toward said first contact, a first aperture in said casing for insertion of a separate tool portion to engage said second contact and move said second contact away from said first contact when said separate tool portion is inserted in said first aperture, a second aperture in said casing, and an electrically conductive projection on said second contact normally within said casing, said projection projecting through said second aperture to establish an electrical connection exteriorly of said casing when said second contact is moved away from said first contact.

2. An element according to claim 1 in which said first contact is shaped as a ring vicinal said first aperture, whereby said tool portion may extend through both said first aperture and said ring.

3. An element according to claim 1 in which at least one of said contacts is formed with a hole and said casing is formed with an opening aligned with said hole for insertion of a lead wire through said opening and into said hole for connection of said contact and said lead wire.

4. An element of the character described comprising a casing, an elongated hollow in the center of said casing and a first and second aperture at either end of said casing communicating with said hollow, said first aperture being normally open and unobstructed from said hollow to the exterior of said casing, a first contact stationary within said hollow directly inside said first aperture, a second contact in said hollow, a stud on said second contact extending into said second aperture, resilient means biasing said second contact into electrical engagement with said first contact, whereby a nonconductive portion of a tool may be inserted through said first aperture and said first contact to engage said second contact and break its electrical engagement with said first contact.

5. An element of the character described comprising a casing, an elongated hollow in the center of said casing and a first and second aperture at either end of said casing communicating with said hollow, an annular first contact stationary within said hollow directly inside said first aperture, a second contact in said hollow having a stud on said second contact extending into said second aperture, resilient means biasing said second contact into electrical engagement with said first contact, whereby a nonconductive portion of a tool may be inserted through said first aperture and said first contact to engage said second contact and break its electrical engagement with said first contact, and a cooperating tool having pivoted jaws adapted to engage opposite ends of said casing, one said jaw having a projecting nonconductive portion shaped to fit through said first aperture and said first annular contact into engagement with said second contact, and jaw actuating means to bring said jaws together toward said casing to move said contacts apart, the other said jaw having an electrical third contact immediately underlying said second aperture whereby said stud projects through said second aperture into engagement with said third contact when said second contact is moved away from said first contact.

6. The combination of claim 5 in which said first-mentioned jaw has an electrical fourth contact, a projection on said fourth contact formed with a hole for said portion of said first jaw to protrude through said hole and said first aperture is dimensioned to receive said fourth contact, whereby said fourth contact electrically engages said first contact.

7. The combination of claim 6 in which said fourth contact has a resilient arm mounted on said first-mentioned jaw biasing said projection on said fourth contact away from said jaw.

8. The combination of claim 5 in which at least one said jaw is formed with a socket, said socket receiving portion of said casing and aligning said casing relative to said first jaw portion.

9. A tool of the character described comprising first and second jaws, means pivotally connecting said jaws together, handles for moving said jaws relative to each other, a non-conductive stud on said first jaw, a first electrical contact on said first jaw, said first contact apertured for said stud and a second electrical contact on said second jaw.

10. A tool according to claim 9 in which said first contact is of resilient material biasing said contact away from said first jaw.

11. An element of a circuit used in testing an electrical component comprising, a casing, a first conductor in said casing, said first conductor comprising a first contact and a first lead wire, said first lead wire connected to said first contact and extending exteriorly of said casing, a second conductor in said casing, said second conductor comprising a second contact and a second lead wire, said second lead wire connected to said second contact and extending exteriorly of said casing, movable means movable in said casing from a first position establishing electrical connection between said contacts to a second position in which said electrical connection is broken, and resilient means biasing said movable means to said first position, said movable means being movable from the exterior of said casing from said first position to said second position against the force of said resilient means, and a cooperating tool having a first and second pivoted jaw adapted to engage opposite ends of said casing to cause said movable means to move from said first position to said second position against the force of said resilient means, at least one of said jaws having an electrical testing connection establishing electrical connection with one of said conductors simultaneously with engagement of said movable means by said jaw.

References Cited by the Examiner

UNITED STATES PATENTS

| | | | |
|---|---|---|---|
| 2,103,891 | 12/1937 | Brown | 339—255 |
| 2,234,876 | 3/1941 | Rehrer | 200—157 |
| 2,546,001 | 3/1951 | Immel | 200—165 |
| 2,569,972 | 10/1951 | Brenner et al. | 339—255 |
| 2,655,572 | 10/1953 | Schwaneke | 200—61.58 |
| 2,727,964 | 12/1955 | Krenke | 200—165 |
| 2,751,470 | 6/1956 | Bissonnette | 200—165 |
| 2,782,275 | 2/1957 | Vance | 200—46 |
| 2,872,659 | 2/1959 | Wills | 339—255 |
| 3,090,029 | 5/1963 | Stroebel | 339—255 |
| 3,124,989 | 3/1964 | Thumim | 200—61.58 |

BERNARD A. GILHEANY, *Primary Examiner.*

ROBERT K. SCHAEFER, *Examiner.*

BENJAMIN DOBECK, *Assistant Examiner.*